United States Patent
Barnett (10) Patent No.: US 8,199,900 B2
(45) Date of Patent: Jun. 12, 2012

(54) AUTOMATED PERFORMANCE MONITORING FOR CONTACT MANAGEMENT SYSTEM

(75) Inventor: James Barnett, Auburndale, MA (US)

(73) Assignee: Aspect Software, Inc., Lombard, IL (US)

(*) Notice: Subject to any disclaimer, the term of this patent is extended or adjusted under 35 U.S.C. 154(b) by 1120 days.

(21) Appl. No.: 11/274,226

(22) Filed: Nov. 14, 2005

(65) Prior Publication Data

US 2007/0112953 A1 May 17, 2007

(51) Int. Cl.
*H04M 3/00* (2006.01)

(52) U.S. Cl. .......... 379/265.03; 379/32.01; 379/33; 379/265.02; 379/265.06

(58) Field of Classification Search ......... 379/265.02, 379/265.06, 265.08, 266.08, 265.03, 265.07, 379/32.01, 33
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,538 A | 7/1999 | Deryugin et al. | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,400,996 B1 | 6/2002 | Hoffberg et al. | |
| 6,611,867 B1 | 8/2003 | Bowman-Amuah | |
| 6,683,947 B2 | 1/2004 | Roelle et al. | |

(Continued)

FOREIGN PATENT DOCUMENTS

EP 0647050 4/2005

OTHER PUBLICATIONS

Baker, Dan, TRI, "Customer Care, Call Center & Self Care Systems in Telecom", http://www.technology-research.com/custcare., Dan Baker, Research Director of Technology Research Institute (TRI),(1999),10 pgs.

*Primary Examiner* — Antim Shah
(74) *Attorney, Agent, or Firm* — Husch Blackwell LLP (57) ABSTRACT

The computer-implemented method includes automatically determining typical behavior pertaining to at least one system parameter of a contact management system. The typical behavior is determined from performance data of the contact management system captured over a first predetermined time period. A deviation from the typical behavior of at least one system parameter of the contact management system is automatically reported.

19 Claims, 5 Drawing Sheets

U.S. PATENT DOCUMENTS

| | | |
|---|---|---|
| 6,732,156 B2 | 5/2004 | Miloslavsky |
| 6,779,177 B1 | 8/2004 | Bahrs et al. |
| 6,880,126 B1 | 4/2005 | Bahrs et al. |
| 6,882,723 B1 | 4/2005 | Peterson et al. |
| 7,039,166 B1 * | 5/2006 | Peterson et al. ........... 379/88.18 |
| 2002/0124078 A1 | 9/2002 | Conrad |
| 2003/0123640 A1 * | 7/2003 | Roelle et al. ............. 379/265.06 |
| 2003/0135382 A1 | 7/2003 | Marejka et al. |
| 2004/0042591 A1 | 3/2004 | Geppert et al. |
| 2004/0049473 A1 | 3/2004 | Gower et al. |
| 2005/0149617 A1 * | 7/2005 | Turnbull et al. .............. 709/203 |
| 2005/0203978 A1 * | 9/2005 | Abraham ...................... 708/200 |
| 2007/0025528 A1 * | 2/2007 | Knott et al. ................ 379/32.01 |

* cited by examiner

AUTOMATED PERFORMANCE MONITORING FOR CONTACT MANAGEMENT SYSTEM

FIELD

This application relates to a monitoring method and system for a contact management system.

BACKGROUND

Contact management systems, such as call center systems, typically have various real-time capabilities for monitoring the performance of their software and hardware. In general, however, these abilities are restricted to notifying an administrator of the occurrence of certain events and errors. These events have to be specified ahead of time when the system is configured. As a result, the monitoring capabilities are inflexible and may fail to detect many significant problems.

For example, Patent Application Publication No. US2003/0135382 (Marejka) describes a self-monitoring system, which monitors parameters and transmits an event message when parameters cross thresholds. Such event messages are sent to a service provider, and determine if an alarm should be generated. During system operation, data is collected periodically, and new monitoring data is compared to recently stored monitoring data to identify events and alarms.

Marejka further describes that the service provider transmits monitoring interfaces to a customer that include current status, concurrently with indicators of prior operating states (e.g., unkeyed alarm indicators). For monitored elements, a multi-tier arrangement divides operating status into three operating ranges (e.g., normal, non-critical, and critical), with current status displayed on the monitoring interfaces on a domain, system, element and component basis. It should be noted that the customer modifies the thresholds and establishes alarm notification criteria used in the system.

U.S. Pat. No. 6,683,947 (Roelle) further describes a system to monitor a call center. The system receives call center data, and determines respective values for a number of measures, based on the call center data. A determination of compliance description is made for each of the number of measures, and an indicator is presented in association with each of the number of measures. The indicator corresponds to a compliance description determined by the measurer.

SUMMARY

According to an embodiment, there is provided a computer-implemented method to monitor performance of a contact management system. The computer-implemented method includes automatically determining typical behavior pertaining to at least one system parameter of the contact management system. The typical behavior is determined from performance data of the contact management system captured over a first predetermined time period. A deviation from the typical behavior of at least one system parameter of the contact management system is automatically reported.

Other features of the present invention will be apparent from the accompanying drawings and from the detailed description that follows.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

For the purposes of the present application, the term "contact management system" shall be taken broadly to include any systems that facilitate and/or manage contacts and communications between entities, and shall be taken to include call center systems, automatic call distribution (ACD) systems, interactive voice response (IVR) systems, customer contact email systems, customer contact text chat systems, and customer contact facsimile systems.

In one example embodiment, there is proposed a monitoring system that monitors a contact management system, determines typical behavior of the contact management system, and performs various actions (e.g., reporting and providing notification to contact management system administrators) when behavior of the contact management system deviates from the determined typical behavior. For example, a database look-up performed by a contact management system might take longer or shorter than is typical, or an IVR application may unexpectedly start taking different routes through its business logic or the speech recognition rate of the IVR may change. It will be appreciated that these conditions are not errors and are furthermore not tied to specific events. Nonetheless, an administrator of a contact management system may wish to receive notification regarding these conditions as any one of them may indicate an underlying problem at the contact management system. Accordingly, in one embodiment, the monitoring system uses machine learning techniques to model behavior of a monitored contact management system, and then performs various actions (e.g., reporting and notification actions) when the observed behavior (e.g., current behavior) of the contact management system deviates from what has previously been determined to be typical behavior.

Figure 1:
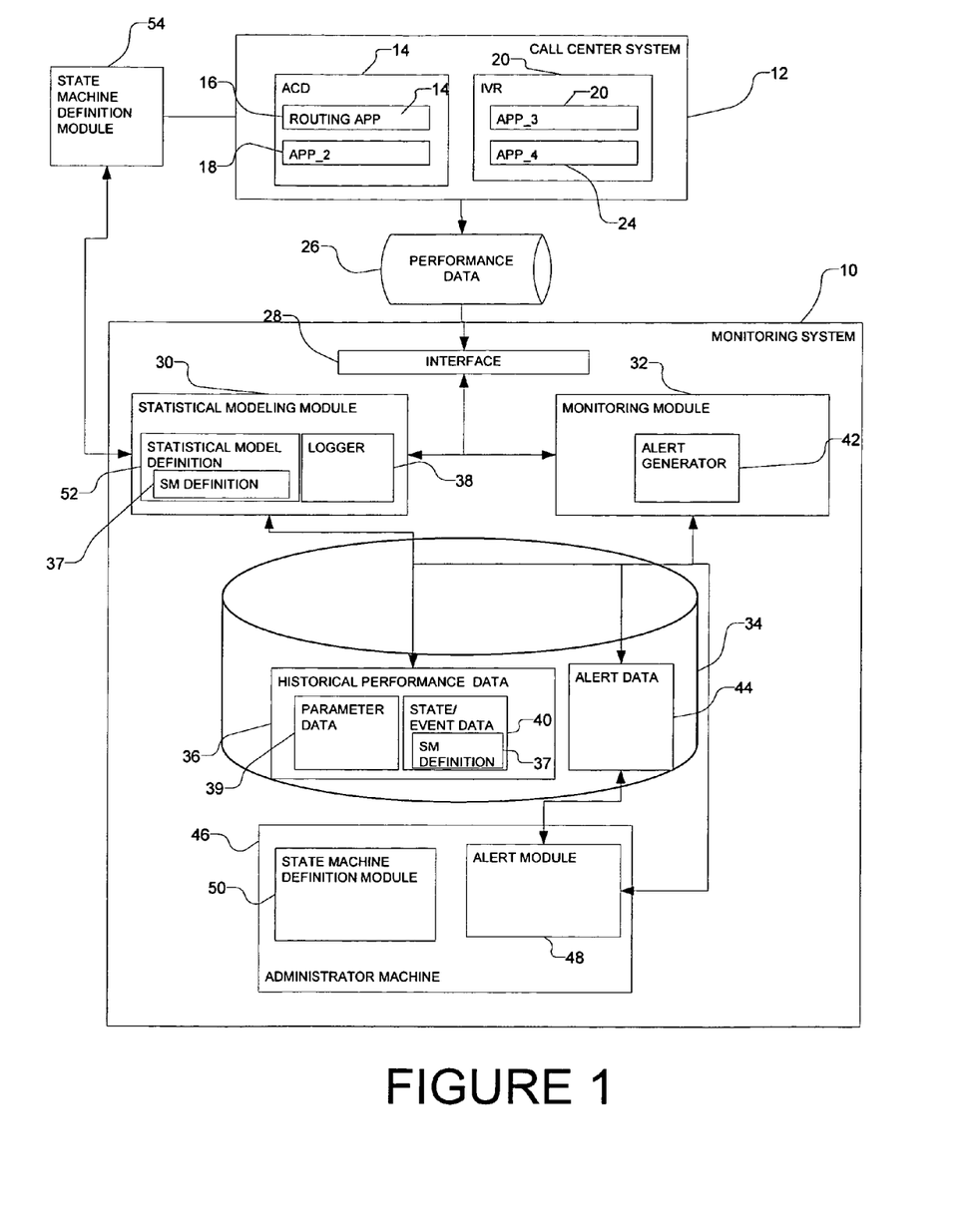
FIG. 1 is a schematic diagram illustrating a system to monitor performance of a contact management system, according to an example embodiment.

FIG. 1 is a block diagram illustrating a monitoring system 10, according to an example embodiment, that is shown coupled to a contact management system in the exemplary form of a call center system 12. While the monitoring system 10 is shown to be distinct from the call center system 12, it will be appreciated that the monitoring system 10 may operate as a component of the call center system 12, in which case the call center system 12 may be regarded as "self-monitoring".

FIG. 1 shows the call center system 12 as including an ACD system 14 that hosts a routing application 16, as well as a number of further applications 18. The call center system 12 is furthermore shown to include an IVR system 20 that hosts and executes a number of applications 22, 24.

Each of the applications of the ACD system 14 and the IVR system 20 are, in the example embodiment, configured to provide performance data 26 to the monitoring system 10. The performance data may include, merely for example, notifications of events that have occurred with respect to the call center system 12, stages of processing that have completed, parameter values etc.

The monitoring system 10 includes an interface 28 to receive the performance data 26 from the call center system 12 and distributes the performance data 26 to a statistical modeling module 30 and a monitoring module 32, each of which may process the received performance data 26 to perform their respective functions. At a high level, the statistical modeling module 30 may store the performance data 26 to a database 34 as historical performance data 36, and may utilize the historical performance data 36 to express typical behavior of the call center system 12. The statistical modeling module 30 may include a logger 38 to write state/event data 40 to the database 34, the state/event data 40, in one example embodiment, being representative of the past behavior of the call center system 12.

The monitoring module 32, in one embodiment, utilizes the performance data 26 to determine current (or recent) behavior of the call center system 12, and to determine whether observed current behavior of the call center system 12 deviates from the typical behavior (e.g., whether a current value of a system parameter of the call center system 12 deviates from a typical value for such a parameter).

The monitoring module 32 also includes an alert generator 42, which accesses alert data 44, also stored in the database 34. The alert data 44 identifies events regarding which an administrator of the call center system 12 has requested notification. The monitoring system 10 may include an administrator machine 46 that hosts an alert module 48 utilizing which an administrator can define alert preferences and requirements, which are then stored as alert data 44 within the database 34.

Furthermore, the alert module 48 may operate to communicate alerts and notifications regarding the call center system 12 to an administrator. To this end, the alert module 48 may, as described in further detail below, provide alerts in a number of ways to an administrator. For example, alerts may be provided in a dash board view via appropriate user interfaces. Further, the alert module 48 may be coupled to various other communications systems (e.g., email, SMS or pager systems) that can provide notifications and reports to an administrator.

The administrator machine 46 is also shown to host a state machine definition module 50 utilizing which, in one example embodiment, an administrator may create a statistical model definition 52 to be used by the statistical modeling module 30 in modeling the typical behavior of the call center system 12. Further details regarding an example of such a statistical model definition 52 are provided below.

At a high level, the monitoring system 10 receives and stores the performance data 26 as the historical performance data 36, and utilizes the historical performance data 36 to build a model of the typical behavior of the call center system 12. It may take weeks or even months of historical performance data 36 to enable the statistical modeling module 30 to build an acceptable statistical model. Once the state machine definition 37 has been created by the statistical modeling module 30, in accordance with the statistical model definition 52, the monitoring module 32 may utilize the state machine definition 37 to monitor the system by examining received performance data 26, reflecting current performance and operations of the call center system 12, with typical behavior as defined by the state machine definition 37. It will be appreciated that the state machine definition 37 may be continually updated by the statistical modeling module 30, based on received performance data 26. A wide variety of statistical techniques may be applied to a determination of the typical behavior of the call center system 12. In one exemplary embodiment, the statistical model definition 52 models the call center system 12 as a state machine. In this embodiment, it is not required that the actual call center system 12 be operated as a state machine, but merely that the monitoring system 10 view the call center system 12 as such a state machine and accordingly interpret the performance data 26 in terms of such a state machine. In a further embodiment, the call center system 12 may in fact be implemented as a state machine, in which case an external state machine definition module 54 may define operations of the call center system 12 (as shown in FIG. 1), and the statistical model definition 52 may accordingly be communicated to the statistical modeling module 30 from the external module 54. In this embodiment, assuming the monitoring system 10 is configured to recognize the implementation of the call center system 12 as a state machine, the administrative machine 46 may not need to host its own state machine definition module 50.

Figure 2:
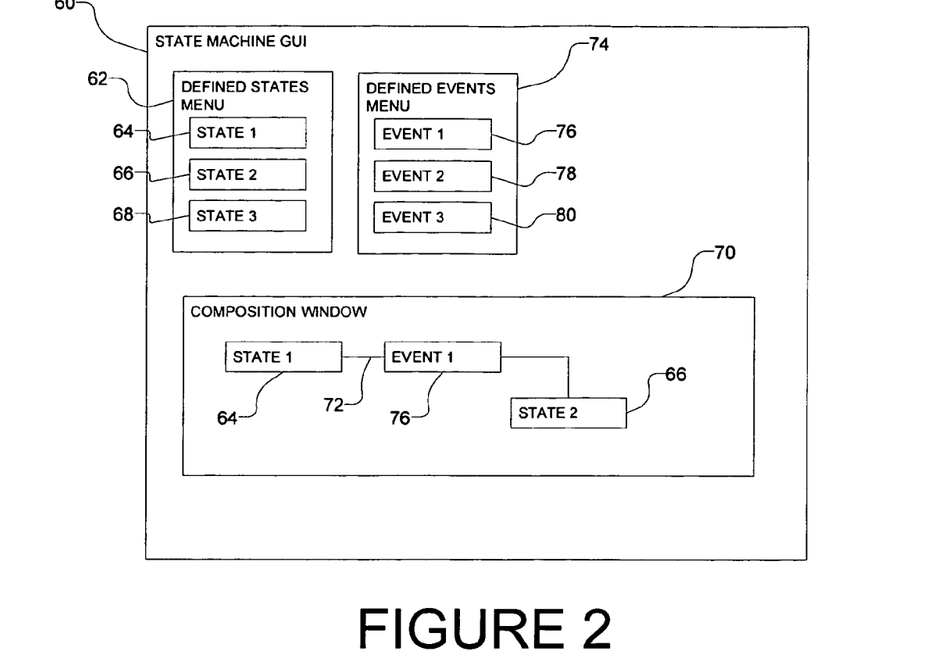
FIG. 2 is a user interface (UI) diagram illustrating an example state machine graphical user interface (GUI) that may be utilized to define a statistical model of a contact management system, according to an example embodiment.

FIG. 2 is a user interface diagram illustrating a state machine graphical user interface (GUI) 60 that may be displayed by the state machine definition module 50, executing on the administrative machine 46, so as to enable the administrator conveniently to define a state machine in terms of which the monitoring system 10 will monitor the call center system 12. In the exemplary embodiment, the GUI 60 provides a drag-and-drop functionality that enables an administrator to develop a state machine representation of a call center system 12. Specifically, a menu 62 of defined states may present a collection of state widgets 64-68, each representing a distinct state of the call center system 12> the widgets 64-68 are user selectable and movable into a composition window 70 via a drag-and-drop operation. Exit branches from the states may then be defined between state widgets to reflect transitions from one state to another. Accordingly, an administrator may model a call center application by arranging widgets within the composition window 70.

The state machine GUI 60 also includes an events menu 74, presenting a collection of events widgets 76-78 that are again user selectable and locatable within the composition window 70 via a drag-and-operation. Accordingly, an administrator creating a statistical model definition 52 may define certain events 76 as causing the state machine representation of the call center system 12 to transition from one state to another. For example, in the depiction shown in FIG. 2, a transition from state 64 to state 66 is defined to occur upon the detection of an event 76 within the call center system 12.

It will be appreciated that when an application developer builds a call center application by arranging graphical widgets on a canvas (e.g., within the composition window 70) the application developer is implicitly defining a state machine for the relevant call center application. In a non graphical language (e.g., Voice XML), the same principle applies. System developers decide which text elements in the language correspond to states. Accordingly, in one embodiment, when an application developer defines an application by arranging language elements in a text file, the application developer would implicitly define the state machine. The monitoring system 10 may leverage such implicit state machine definitions of an application executing within the context of the call center system 12 as part of the statistical model definition 52.

Regardless of the manner in which applications of the call center system 12 are defined by an application developer, execution of applications within the system 12 at runtime result in a series of commands and responses. These commands and responses are included in the performance data 26 communicated to the monitoring system 10. In the example embodiment in which the statistical model definition 52 defines a state machine, the performance data 26 may be processed via the statistical modeling module 30 to recognize events as defined by the relevant state machine model. Accordingly, at runtime, each of the modules 30 and 32 may interpret the performance data 26 in terms of a state machine model defined by the statistical model definition 52. At runtime, the monitoring system 10 may interpret the performance data in the following form:

State1 (time1), event1 (time2), event2 (time3), state2 (time4), event3 (time5), state3 (time6).

The above information indicates that the call center system 12 entered state1 at time1, that event1 occurred at time2, followed by event2 at time3. The call center system 12 then transitioned to state2 at time4, and event3 occurred at time5, and the system had then moved to state3 at time6.

Figure 3:
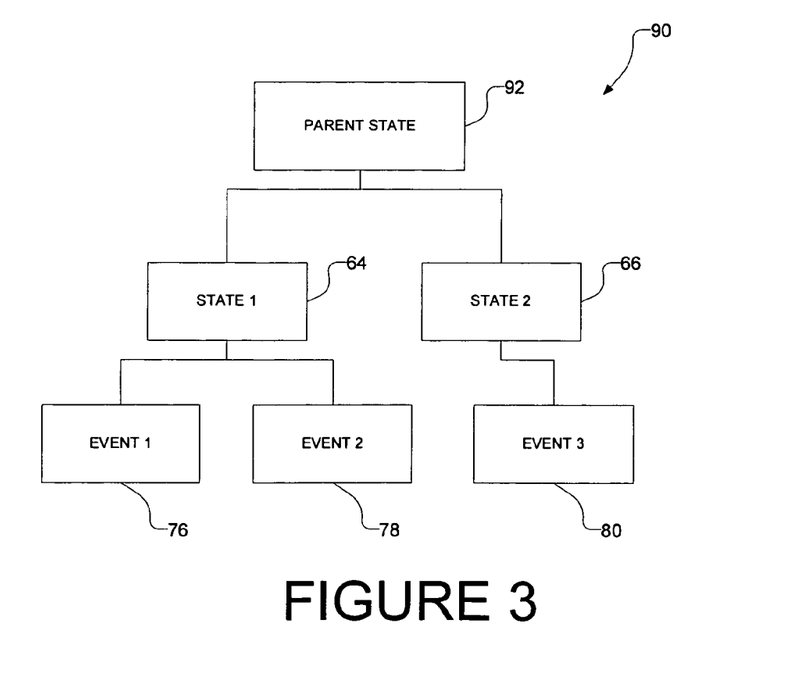
FIG. 3 is a block diagram illustrating a hierarchy of states that may be defined as part of a statistical model of typical behavior of a contact management system, according to an example embodiment.

In a further embodiment, the statistical model definition 52 may define states of the call center system 12 in a hierarchal fashion. Considering the above example, the call center system 12 is in state1 from time1 to time4, and event1 and event2 occur while the system 12 is in state2. Accordingly, in one embodiment, a "super state" or parent state may be defined which consists of state1 and state2. FIG. 3 is a hierarchy diagram illustrating a state hierarchy 90, according to an exemplary embodiment, which includes a parent state 92 which is defined to consist of state 64 and state 66.

In the example performance data sequence described above, the call center system 12 may be regarded as having resided in parent state 92 from time1 to time6, and events 1, 2 and 3 may be viewed as having occurred while the call center system 12 was in the parent state 92. Accordingly, the state machine hierarchy 90 represents a course-grain state machine, which does not distinguish between state 64 and state 66. The state machine hierarchy 90 thus provides different levels of granularity at which an administrator of the call center system 12 may wish to monitor the system 12.

Further, it should be noted that it will not be necessary for the monitoring system 10 to log data about each of such defined "super states" directly. If all information regarding the lowest level states within a hierarchy 90 is recorded, data for parent states may be computed automatically.

Utilizing the definition of the state machine, the monitoring system 10 may now build the state machine definition 37 in terms of the statistical model definition 52. For example, the statistical modeling module 30 may, for each state, compute a mean length of time spent in the respective state, plus the frequencies of transitions from the state, as well as events that occur while in the respective state. Consider for example that, in a particular state A, the mean length of time might be 200 milliseconds with a standard deviation of 50 milliseconds. State A may transition to state B 75% of the time, to state C 15% of the time, and to state D 10% of the time. Further, while in state A, the probability of events may be observed as event A 100% of the time, event B 65% of the time, and event C 33% of the time.

Given the above statistics, the monitoring system 10 is now in a position to report atypical behavior. In one embodiment, standard deviation may be important in determining what to recognize as atypical behavior. For example, say that on a given call, the call center system 12 spends 250 milliseconds in state A. On the assumption that the duration of residing in state A is normally distributed, the call center system 12 is expected (in terms of typical behavior) to spend 250 milliseconds or more in state A roughly 16% of the time. Accordingly, when the system 12 resides in state A for 250 milliseconds, this would not be regarded as atypical behavior. On the other hand, if the standard deviation of time spent in state A was 10 milliseconds, instead of 50, then the occurrence of a duration of 250 milliseconds for state A would have a probability of close to zero, and this would be regarded as highly atypical by the monitoring system 10.

Further, in order to utilize transition statistics, the monitoring system 10 may observe multiple occurrences of states. For example, the fact that the call center system 12 transitions from state A to state D once it is not significant in and of itself. However, if over an extended period, the monitoring system 10 observes that the call center system 12 is transitioning from state A to state D 50% of the time instead of the expected 10%, the alert generator 42 may recognize this as being atypical behavior. Accordingly, in one embodiment, the monitoring system 10 may assume that transitions follow a multinomial distribution, with individual transition probabilities provided by statistics generated from the historical performance data 36.

Given a sequence of transitions from state A, for a reasonably large value of N, the statistical modeling module 30 computes a standard deviation of the multinomial distribution, and the alert generator 42 utilizes the standard deviation to determine whether the behavior of the system 12 is atypical. Further, for events that occur while the system 12 is in a given state, the monitoring system 10 may assume that the events are independent of each other and that each follows a binomial distribution. Again, given N occurrences of state A, for a suitable value of N, the alert generator 42 may utilize the properties of the binomial distribution to determine if the number of occurrences of any given event is atypical. In a further example embodiment, deploying a sophisticated model, interdependencies between events may be taken into account.

Figure 4:
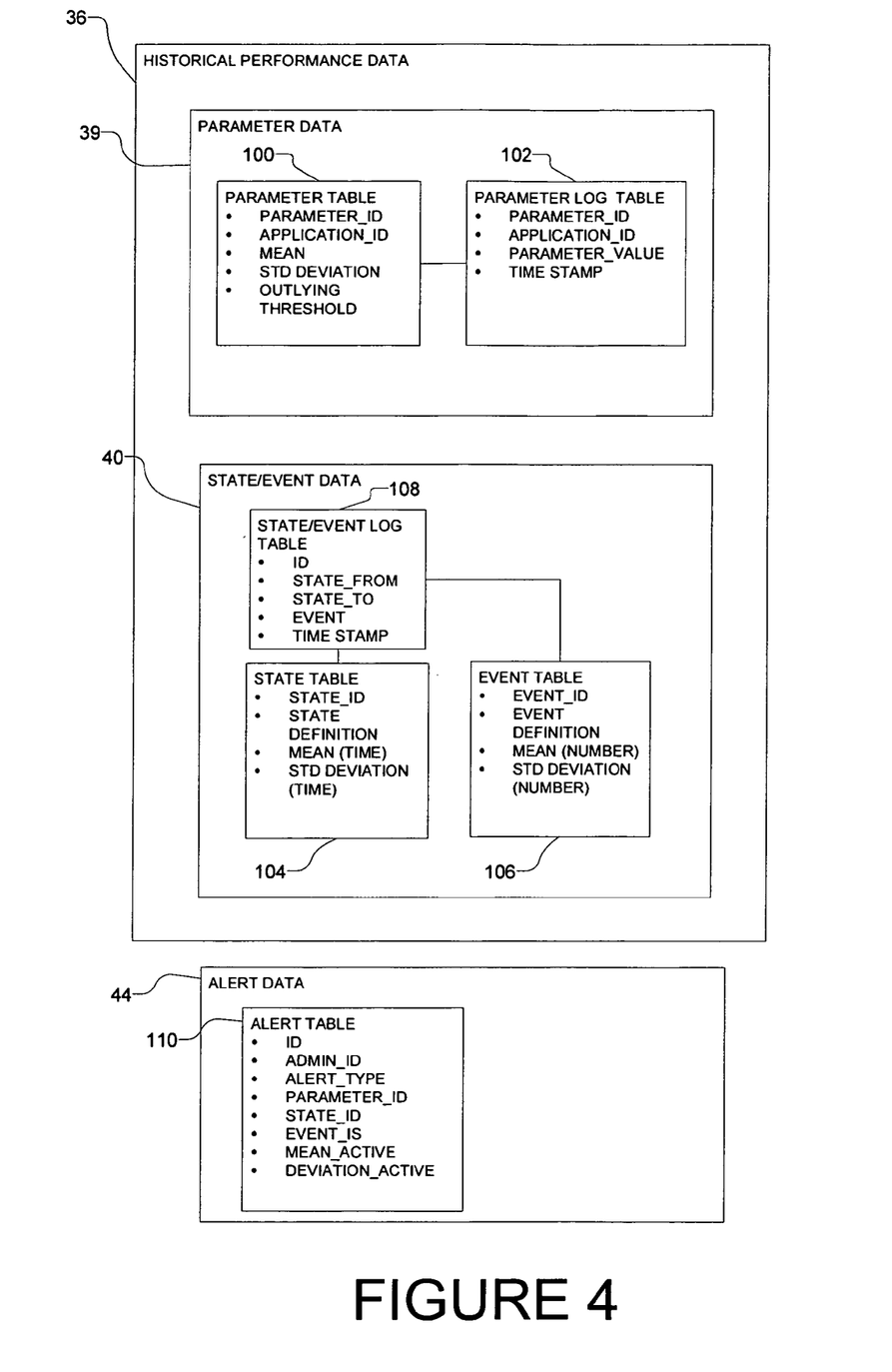
FIG. 4 is a block diagram illustrating various data structures that may be maintained by the monitoring system of FIG. 1.

FIG. 4 is an entity relationship diagram providing further details regarding the historical performance data 36, the state/event data 40 and the alert data 44 that are maintained by the monitoring system 10 in the database 34.

The historical performance data 36 includes parameter data comprising a parameter table 100 storing records for each of a number of parameters pertaining to the call center system 12 that contribute towards the statistical model of the call center system 12. The various parameters maintained in the table 100 may pertain to both hardware and software components of the call center system 12. For example, certain parameters may relate to memory access times, whereas other parameters may be application specific (e.g., relating to the routing application 16 of the ACD system 14). The parameter table 100 may, for each parameter, store a parameter identifier, an application identifier, a mean value, a standard deviation, and optionally a covariance matrix for the entire parameter set.

The historical performance data for the various parameters as listed in the parameter table 100 is captured over time by a logger 38 in a parameter log table 102. Specifically, in addition to a parameter identifier and an application identifier, the log table 102 stores a particular parameter value and an associated time stamp for parameter values received within the performance data 26 from the call center system 12. The parameter value and time stamp information contained within the log table 102 are then utilized, by the statistical modeling module 30, to update the mean, and standard deviation values stored within the parameter table 100 on a periodic or near real time basis. For example, the statistical modeling module 30 may utilize data stored within the log table 102 for a predetermined past time period (e.g., a preceding two months) to calculate updated mean, and standard deviation values on a daily basis, and then update the parameter table 100 accordingly.

The state/event data 40 includes a state table 104 that defines each of the states of the call center system 12, recognized by the monitoring system 10, based on received performance data 26. Further, an event table 106 stores information defining events recognized by the monitoring system 10 as having occurred at the call center system 12, again based on the performance data 26 received at the monitoring system 10.

A log table 108 is populated by the logger 38 with information indicating state transitions and events that are determined to have occurred with respect to the call center system 12. To this end, each entry within the log table 108 includes an identifier, a STATE_FROM identifier indicating an exit state, a STATE_TO identifier indicating an entry state, an event identifier identifying an event, and a time stamp recording a time at which a state transition (or an event) occurred.

In order to enable the logger 38 to generate state and event data for the log table 108, the logger 38 is shown in FIG. 1 also to be aware of the state machine definition 37 within the state/event data 40. Alternatively, the logger 38 may maintain a local state machine definition (not shown), or may access a state machine definition 37 that forms part of the statistical model definition 52.

The alert data 44, as shown in FIG. 4, includes an alert table 110 within which is stored information identifying alerts that may be defined by one or more administrators of the call center system 12. To this end, each record within the alert table 110 includes an identifier, an administrator identifier uniquely identifying the administrator to which the alerts apply, alert type information identifying the type (e.g., on screen, email, pager etc.) alert that should be generated, a parameter identifying one or more parameters applicable to the particular alert, one or more state identifiers identifying states applicable to the alert, one or more event identifiers identifying events applicable to the alert, and mean and activation active flags indicating data that should be included in the alert. Alert activation data may also indicate conditions in which an alert should be generated (e.g., a parameter value is a predetermined number of deviations exceeds at least one of a predetermined number of standard deviations from the mean or exceeds an absolute deviation value).

Figure 5:
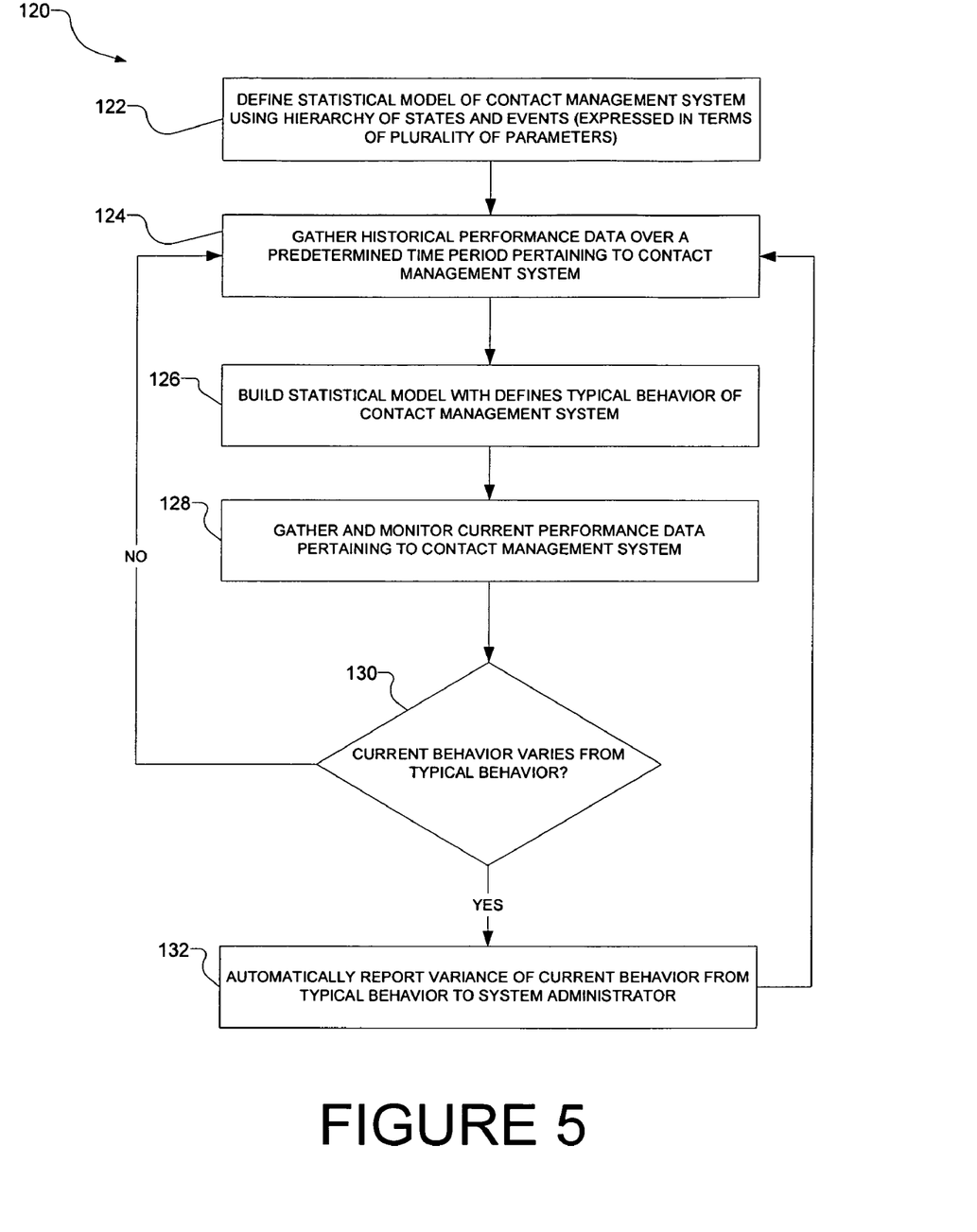
FIG. 5 is a flow chart illustrating a method, according to one example embodiment, to monitor performance of a contact management system.

FIG. 5 is a flow chart illustrating a method 120, according to an example embodiment of the present invention, to monitor performance of a contact management system (e.g., the call center system 12).

The method 120 commences at block 122, with the definition of a statistical model of the call center system 12. In one example embodiment, the call center system 12 may be modeled as a state machine, described above, and the model may be expressed in terms of a number of parameters, states and events pertaining to hardware and software components of the call center system 12. The statistical model may, in one embodiment, be defined by an administrator utilizing the state machine definition module 50 executing on the administrator machine 46 to create the statistical model definition 52 that forms part of the statistical modeling module 30.

At block 124, the statistical modeling module 30 gathers historical performance data, over a predetermined time period, pertaining to the call center system 12. As noted above, the historical performance data 36 is generated from the performance data 26 communicated from the call center system 12 to the monitoring system 10 over a period of time. The statistical modeling module 30 may furthermore process the received performance data 26 (e.g., via time stamping the data) in order to gather and create the historical performance data 36.

At block 126, the statistical modeling module 30 proceeds to build a statistical model from which typical behavior of the call center system 12 is determinable. The typical behavior of the call center system 12 may be automatically determinable according to any one of a number of well-known statistical techniques, certain of which are described herein. In one embodiment, the determination of the typical behavior of the statistical model of the system 12 involves processing of the historical performance data gathered over the predetermined time period to block 124 utilizing the described statistical techniques. The definition of the typical behavior of the call center system 12 at block 126 may, in one embodiment, include generating a mean value and standard deviation value for each of the parameters for which a record exists within the parameter table 100. Where the determining of the typical behavior pertaining to a system parameter includes generating a mean value and standard deviation for the at least one system parameter of the contact management system, the method may include (at block 132) automatically generating the notifier regarding the deviation when the value of the system parameter exceeds a predetermined number of standard deviations from a mean or exceeds an absolute deviation value. The determining of the typical behavior may further include generating the short term average and standard deviation of at least one system parameter. In this embodiment, the method may include (at block 132) automatically generating a notifier regarding the deviation when the current short-term average for the at least one system parameter exceeds a predetermined number of standard deviations from the historical mean. The method may also include (at block 132) generating a notifier when the variability of the at least one system parameter is statistically significantly different from the long-term standard deviation.

At block 128, the monitoring module 32 then proceeds to gather and monitor current performance data pertaining to the call center system 12. Again, performance data 26 is communicated to the monitoring module 32 via the interface 28 which compares the current performance data to the historical performance data 36.

At decision block 130, the monitoring module 32 determines whether the current behavior, as discerned from the current performance data, varies from the typical behavior of the system 12, as reflected by the historical performance data 36. For example, a parameter of values indicative of the current performance of the system 12 may be compared to mean, and deviation values stored within the parameter table 100. Similarly, state and event values (e.g., a frequency of transition) can be compared to mean, and deviation values stored within the state and event tables 104 and 106. In one embodiment, the determination that the current behavior varies from the typical behavior of the system 12 may include determining that the deviation of one or more parameters, or one or more state or event values, exceeds a predetermined number of standard deviations from the mean value for the relevant parameter, state or event. For example, with reference to states, the state table 104 may record a mean time that the system 12 has resided in one or more of the states defined in the table 104. With reference to events, the event table 106 may record the mean number of occurrences and standard deviation of a particular event while the system 12 resides in a particular state.

In the event that the current behavior does not vary from the typical behavior, the method 120 loops back to block 124 where the statistical modeling module 30 continues to build the historical performance data 36, and the monitoring module 32 continues to gather and monitor current performance data pertaining to the system 12.

On the other hand, should it be determined at decision block 130 that the current behavior does in fact vary from the typical behavior of the call center system 12, the method 120 progresses to block 132, where the alert generator 42 of the monitoring module 32 generates an alert, as specified by data within the alert table 110. In one embodiment, the automatic reporting of the variance of the current behavior from the typical behavior to a network administrator includes automatically generating a notifier regarding the deviation of at least one or more system parameters of the call center system 12.

The reporting at block 132 may also include generating a graph to graphically display the deviation from the typical behavior.

The method 120 then terminates at block 134.

The automatic reporting of the variance of current behavior from typical behavior of the system 12 may take a variety of forms. For example, an administrator of the call center system 12 may be interested in either aggregate or detailed information. As a simple example, consider duration information (e.g., information on how long a certain operations take to perform). The system administrator may wish to know how the overall call duration compares to an average, or how certain operations within calls (e.g., database accesses) compare to an average.

Another interesting form of organization revolves around applications that may be executing within the context of the call center system 12. In one embodiment, "applications" may include business logic that controls the processing of a call, whether it is handled by an IVR system 20, or routed to a human agent. Usually behavior of a call center system 12 may depend on the application controlling the system 12. Accordingly, data gathered on a per application basis may prove useful to an administrator of a call center system 12. For example, the routing application 16 may select an agent to receive a call, and deliver the call to the selected agent. Such a routing operation is relatively quick compared to IVR operations performed via IVR applications that interact with the caller and accordingly usually take longer. Accordingly, the aggregate view of how long calls are taking to be processed compared to the norm may not be revealing, as the mix in types of calls may tend to be of very different durations. Knowing how long a specific application is taking to perform its respective functions may be much more informative and illuminating to an administrator of a call center system 12.

Similarly, it is useful for an administrator of a call center system 12 to be able to "drill down" within applications, and to discern how the duration of a given operation compares to the typical historical performance of that operation by the relevant application.

Call behavior may also vary by time of day, or year. In that case, an administrator of a call center system 12 may select to view information on how the call center system 12 behavior compares to the norm for the current time of day, or year.

Finally, since behavior of a call center system 12 changes over time, in one embodiment, the monitoring system 10 provides an administrator with the option of what to do with old data (e.g., data gathered months or years ago, and that is outside the predetermined time period referenced in block 124). In one embodiment, the alert module 48 enables the administrator to retain it, so that the typical behavior is based on data gathered since installation. Alternatively, the alert module 48 may enable the administrator to age the historical performance data, so that older data is retained, but not weighted as heavily as recent data, or is omitted altogether so that the typical behavior of the call center system 12 is determined based only on recent data (e.g., data gathered over the last few weeks or months).

The duration of an operation, or a residency in a particular state, is a further example of data where a comparison to a norm, reflecting typical behavior, is useful. There are of course many other examples including information on how the results of certain operations compare to a mean. Examples include whether a speech recognizer is returning meaningful results, whether callers' information has been located in a database or, in applications that place outbound calls, whether a human or fax machine is answering. Other useful information includes which paths callers are taking through an application. For example useful information may indicate how many callers of IVR application are asking for account balances, as opposed to payment information, or how many callers are asking to be transferred to an operator.

In addition to selecting what information is to be monitored, an administrator may also choose the manner in which he or she wishes to be notified. For example, an administrator may choose automatic notification (e.g., via an SNMP trap) when data exceeds its normal variance. Alternatively, a notification could be provided via a real time display.

For such a real time display, an administrator may choose which data is to be monitored, and may receive a continually updated display showing comparisons to a norm reflecting typical behavior. In one embodiment, such a display shows both the degree and frequency of a deviation from a norm on different axis. For example, should an administrator be monitoring the duration of database lookups, it will be appreciated there is a difference between showing that a few accesses took much longer than normal, and knowing that most attempts are taking somewhat longer than normal. It should also be noted that in either case, showing the degree in frequency of deviation from normal behavior is different from identifying a specific error (e.g., database operation took longer than two seconds). Specifically, providing verification on a deviation from typical behavior does not require the administrator of the call center system 12 to explicitly configure parameters under which notification should occur. In the above example, the administrator of the call center system 12 did not have to decide that two seconds was an appropriate threshold, since the monitoring system 10 would have determined the typical time for such a database operation.

Figure 6:
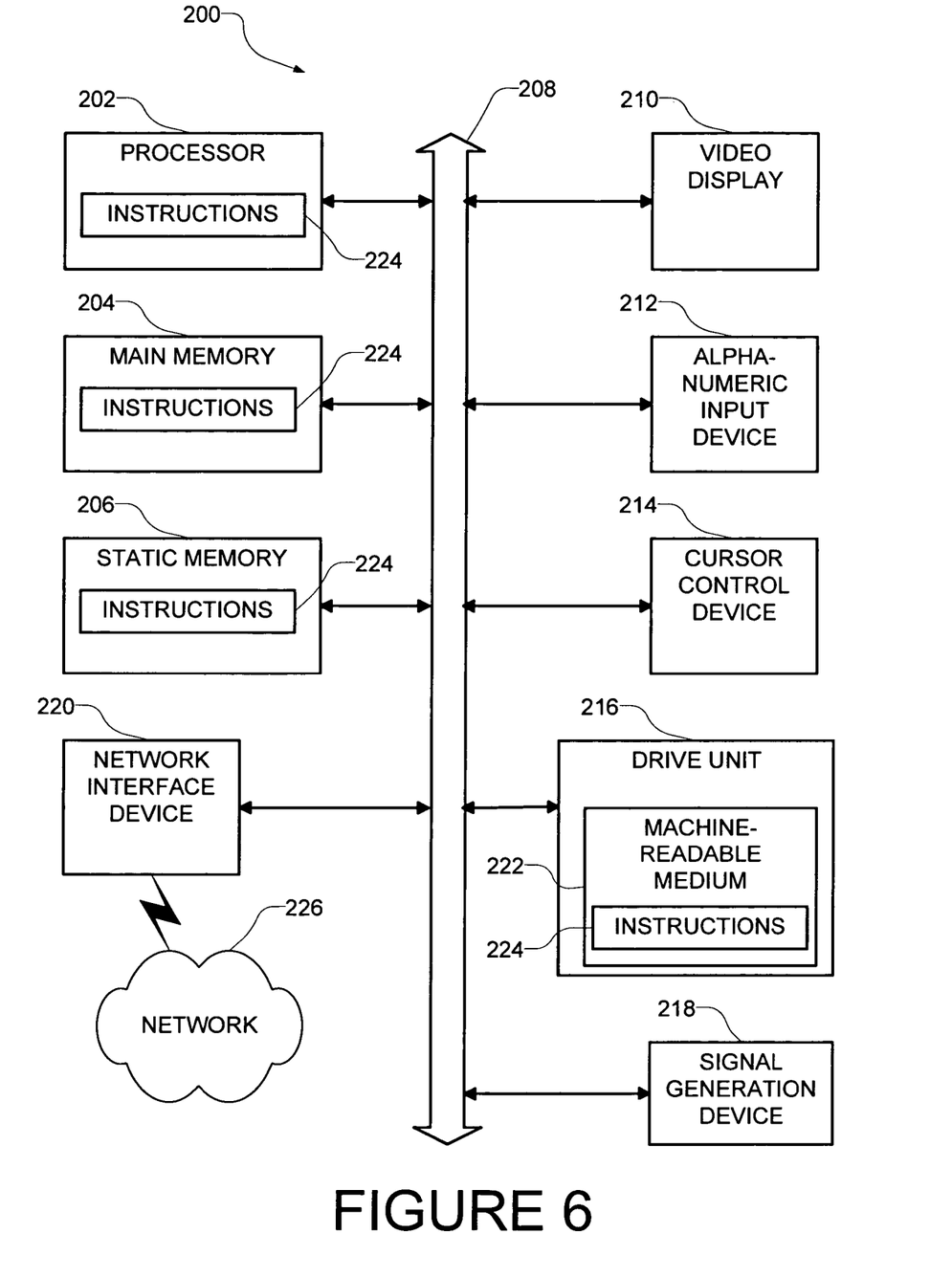
FIG. 6 shows a diagrammatic representation of machine in the example form of a computer system within which a set of instructions, for causing the machine to perform any one or more of the methodologies discussed herein, may be executed.

FIG. 6 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be an ACD system, an IVR system personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer system to monitor performance of a contact management system, the computer system including:
    a modeling module which automatically builds a continually updated statistical model modeling the contact management system as a state machine to determine prior typical behavior of the contact management system pertaining to at least one system parameter of the contact management system, the typical behavior being automatically determined and updated on a continual basis from received historical performance data interpreted in terms of the state machine and reflecting past performance of the contact management system captured over a first predetermined past time interval, the modeling module computing a mean length of time spent in each state of the state machine and frequencies of transitions from each state; and
    a monitoring module, configured to recognize implementation of the contact management system as the state machine, which receives current performance data reflecting current performance of the contact management system and automatically determines whether current behavior based on the current performance data varies from the typical behavior of the system, and to report a deviation from the typical behavior of the at least one system parameter of the contact management system interpreted as the state machine.

2. The computer system of claim 1, wherein the monitoring module is automatically to generate a notifier regarding the deviation from the typical behavior of at least one system parameter of the contact management system and wherein the historical performance data is continually updated such that older data is weighted less than recent data.

3. The computer system of claim 2, wherein the modeling module is to generate a mean value for the at least one system parameter of the contact management system, and the monitoring module is automatically to generate the notifier regarding the deviation when the value of the at least one system parameter exceeds at least one of a predetermined number of standard deviations from the mean.

4. The computer system of claim 3, wherein the predetermined number of standard deviations is specified by an administrator of the contact management system.

5. The computer system of claim 1 further comprising a graphical user interface too enable an administrator to define the state machine including a menu of defined states presented as user selectable state widgets each representing a distinct state of the contact management system, and exit branches from the defined states, the branches definable between the state widgets to reflect transitions from one state to another.

6. The computer system of claim 5 wherein the graphical user interface further comprising an events menu presenting a plurality of user selectable event widgets to enable the administrator to define events of the state machine as causing the state machine model to transition from one state to another.

7. The computer system of claim 6 wherein the modeling module processes the historical performance data to recognize the defined events of the state machine model.

8. The computer system of claim 1 wherein the contact management system is implemented as the state machine.

9. A computer-implemented method to monitor performance of a contact management system, the computer-implemented method comprising computer program instructions recorded on a non-transitory computer readable medium and executed by a processor for carrying out the method including:
    automatically building a continually updated statistical model modeling the contact management system as a state machine and determining prior typical behavior pertaining to at least one system parameter of the contact management system, the typical behavior being automatically determined and updated on a continual basis from historical performance data interpreted in terms of the state machine and reflecting past performance of the contact management system captured over a first predetermined past time period and automatically computing, for each state of the state machine, a mean length of time spent in each state and frequencies of transitions from each state; and automatically receiving current performance data reflecting current performance of the contact management system within the state machine model and automatically reporting a deviation from the typical behavior of the at least one system parameter of the current performance data of the contact management system.

10. The computer-implemented method of claim 9, wherein the automatic reporting of the deviation includes automatically generating a notifier regarding the deviation from the typical behavior of at least one system parameter of the contact management system.

11. The computer-implemented method of claim 10, wherein the determining of the typical behavior pertaining to the at least one system parameter includes generating a mean value for the at least one system parameter of the contact management system, the method including generating the notifier regarding the deviation when the value of the at least one system parameter exceeds at least one of a predetermined number of standard deviations from the mean.

12. The computer-implemented method of claim 9, including:
defining the statistical model including a plurality of system parameters of the contact management system;
automatically determining a typical behavior of the statistical model based on the historical performance data of the contact management system captured over the first predetermined past time period; and automatically reporting the deviation when current behavior of the statistical model deviates from the typical behavior.

13. The computer-implemented method of claim 12, wherein the definition of the statistical model includes defining a plurality of states for the contact management system, and expressing the statistical model in terms of the plurality of states.

14. The computer-implemented method of claim 13, wherein the definition of the statistical model includes defining a plurality of events relating to the contact management system, and expressing the statistical model in terms of the plurality of events.

15. The computer-implemented method of claim 9, including receiving, from an administrator of the contact management system, identification of the at least one system parameter as a monitored parameter.

16. The computer-implemented method of claim 9, wherein the reporting of the deviation from the typical behavior includes reporting at least one of a degree of the deviation and a frequency of the deviation.

17. The computer-implemented method of claim 9, wherein the reporting of the deviation includes generating a graph to graphically display the deviation from the typical behavior.

18. A tangible machine-readable storage device storing instructions that, when executed by machine, cause the machine to perform the steps of:
automatically building a continually updated statistical model modeling a contact management system as a state machine model and determining prior typical behavior pertaining to at least one system parameter of the contact management system, the typical behavior being automatically determined and updated on a continual basis from historical performance data interpreted in terms of the state machine model and reflecting past performance of the contact management system captured over a first predetermined past time period, and automatically computing a mean length of time spent in each state of the state machine model and frequencies of transitions from each state; and
automatically receiving current performance data reflecting current performance of the contact management system within the state machine model and automatically reporting a deviation from the typical behavior of the at least one system parameter of the current performance data of the contact management system.

19. A computer system to monitor performance of a contact management system, the computer system including:
first means for automatically building a continually updated statistical model, modeling the contact management system as a state machine, for determining typical behavior of the contact management system pertaining to at least one system parameter of the contact management system, the typical behavior being determined and updated on a continual basis from historical performance data, interpreted in terms of the state machine, of the contact management system captured over a first predetermined past time period and means for computing a mean length of time spent in each state of the state machine and frequencies of transitions from each state; and
second means, configured to recognize implementation of the contact management system as the state machine for receiving current performance data reflecting current performance of the contact management system and automatically determining whether current behavior based on the current performance data varies from the typical behavior of the system, and reporting a deviation from the typical behavior of the at least one system parameter of the contact management system.

* * * * *